United States Patent
Farmwald et al.

(10) Patent No.: US 7,381,271 B2
(45) Date of Patent: Jun. 3, 2008

(54) COLORANT DISPENSING SYSTEM FOR ADDING COLORANT TO PRE-COMMINUTED MATERIAL AND METHOD OF COLORING SAME

(76) Inventors: Royce A. Farmwald, 67481 County Rd. 27, Goshen, IN (US) 46526; Paul J. Farmwald, 5417 Jordan, Allendale, MI (US) 49401

( * ) Notice: Subject to any disclaimer, the term of this patent is extended or adjusted under 35 U.S.C. 154(b) by 571 days.

(21) Appl. No.: 10/885,567

(22) Filed: Jul. 6, 2004

(65) Prior Publication Data

US 2005/0006419 A1  Jan. 13, 2005

(51) Int. Cl.
B05C 19/00 (2006.01)
B05C 5/00 (2006.01)
B05C 11/00 (2006.01)
B67D 3/00 (2006.01)

(52) U.S. Cl. .............. 118/303; 118/308; 118/692; 118/712; 222/163; 222/485

(58) Field of Classification Search ........... 118/303, 118/308, 692, 693, 712; 427/212, 220, 215, 427/218, 180, 242; 222/478–485, 160–163, 222/310; 422/32; 366/137.1, 138
See application file for complete search history.

(56) References Cited

U.S. PATENT DOCUMENTS

| | | | |
|---|---|---|---|
| 2,707,690 A | 5/1955 | Pearson | |
| 3,329,322 A * | 7/1967 | Herd | .......... 222/485 |
| 3,462,083 A | 8/1969 | Kautz | |
| 3,481,686 A | 12/1969 | Ivnäs et al. | |
| 3,911,183 A | 10/1975 | Hinkes | |
| 4,335,965 A * | 6/1982 | Faverty et al. | .......... 366/163.2 |
| 4,542,041 A | 9/1985 | McClellan et al. | |
| 4,794,022 A | 12/1988 | Johnson et al. | |
| 5,077,128 A | 12/1991 | Bernard et al. | |
| 5,192,587 A | 3/1993 | Rondy | |
| 5,308,653 A | 5/1994 | Rondy | |
| 5,358,738 A | 10/1994 | Sawka | |
| 5,562,956 A | 10/1996 | White, Jr. | |
| 5,564,222 A | 10/1996 | Brody | |
| 6,207,228 B1 | 3/2001 | Hundt et al. | |
| 2004/0170759 A1 | 9/2004 | Bardos et al. | |

FOREIGN PATENT DOCUMENTS

| | | |
|---|---|---|
| GB | 647784 | 12/1950 |
| GB | 1284535 | 8/1972 |
| GB | 1466186 | 3/1977 |
| GB | 1569918 | 6/1980 |
| GB | 2255080 | 10/1992 |

* cited by examiner

Primary Examiner—Yewebdar T Tadesse
(74) Attorney, Agent, or Firm—Bliss McGlynn, P.C.

(57) ABSTRACT

The present invention is a system for adding colorant to pre-comminuted material. The colorant dispensing system includes a supply hopper to selectively retain and discharge dry colorant. The colorant dispensing system further includes a colorant dispensing assembly to receive dry colorant from the supply hopper and dispense dry colorant onto pre-comminuted material (M) before it is processed by a waste reducing section of a waste reducing machine. The present invention is also a method of dispensing colorant onto pre-comminuted material before processing by a waste reducing machine. The method includes the steps supplying dry colorant from a supply hopper to a colorant dispensing assembly and dispensing a controlled amount of dry colorant through the apertures onto pre-comminuted material prior processing the pre-comminuted material by a waste reducing section of a waste reducing machine into colored mulch.

19 Claims, 6 Drawing Sheets

COLORANT DISPENSING SYSTEM FOR ADDING COLORANT TO PRE-COMMINUTED MATERIAL AND METHOD OF COLORING SAME

BACKGROUND OF THE INVENTION

1. Field of the Invention

The present invention relates generally to systems for adding colorant to pre-comminuted material and methods of coloring same and, more particularly, to a colorant dispensing system for adding colorant to pre-comminuted material and a method of coloring pre-comminuted material.

2. Description of the Related Art

Processing wood from raw timber into lumber and from lumber into refined wood stock for specific applications produces a waste material by-product. This by-product is recycled and used to create other wood products. By way of example, certain waste material is compressed and glued together to form oriented strand board ("OSB"), which is used in several commercial and residential construction applications.

Additional recycling techniques involve using waste material in landscaping applications. In landscaping applications, waste material is reduced, for example by grinding or shredding. The resulting product is commonly referred to as, "mulch." Mulch is commonly used as a weed barrier and/or to improve water retention around trees/plants, but may also be used simply to improve the aesthetic quality of a landscape. To this end, mulch may be color-dyed to any number of different colors or shades and may also be treated with a number of chemicals such as pesticides or herbicides during the waste reducing process.

Generally speaking, this process commonly involves either spray-coating the material with a liquefied colorant during the waste reducing process or immersing the material in a color bath after the waste reducing process. Accordingly, the traditional processes occur during or after the waste reducing process and require a substantial amount of both colorant and water to facilitate treatment of the wood mulch with a colorant.

By using a liquid-based colorant, the traditional processes requires complex cleaning of the waste reducing machine components between color changes, resulting in substantial machine and labor "down time." This downtime also results in loader and trucking operator downtime as well. Further, with respect to bath treatments, the bath housing generally consumes a substantial area adjacent the waste reducing machine, resulting in an inefficient use of space and a cumbersome work environment. Additionally, bath treatments, and some spray-coating applications, require a drying phase to cure the liquid-based colorant to the material, which can reduce quantity of mulch available for use at a given time. If, packaged before properly cured, the wet mulch also generates increased transportation costs due to the additional weight. Further, with respect to spray-coating treatments, the spray application may be indirectly applied to the adjacent equipment and ground through overspray or dripping, which may adversely affect the equipment, the ground, or both.

Thus, there is a need in the art for a system that treats pre-comminuted material with a colorant prior to the material entering the waste reducing process. Further, there is also a need in the art for a system that applies colorant to pre-comminuted material before the waste reducing process that reduces the amount of liquid consumed while coloring. There is further a need in the art for a system that applies a dry colorant to pre-comminuted material before the waste reducing process that reduces the amount of colorant necessary to produce colored mulch. There is still further a need in the art for a system that distributes a dry colorant to pre-comminuted material before the waste reducing process that provides efficient transition between different colorants to reduce waste reducing machine downtime. There is still further a need in the art for a method of coloring pre-comminuted material with colorant before processing by the waste reducing section of a waste reducing machine. There is further a need in the art for a method of coloring pre-comminuted material with colorant before the waste reducing process that applies a controlled amount of colorant to a sensed quantity of pre-comminuted material to efficiently color the entire quantity. Therefore, there is a need in the art to provide a system and process that meets these desires.

SUMMARY OF THE INVENTION

Accordingly, the present invention is a system for adding colorant to pre-comminuted material. The colorant dispensing system includes a supply hopper to selectively retain and discharge dry colorant. The colorant dispensing system further includes a colorant dispensing assembly to receive dry colorant from the supply hopper and dispense dry colorant onto pre-comminuted material (M) before it is processed by a waste reducing section of a waste reducing machine.

Accordingly, the present invention is also a method of dispensing colorant onto pre-comminuted material before processing by a waste reducing machine. The method includes the steps of supplying dry colorant from a supply hopper to a colorant dispensing assembly and dispensing a controlled amount of dry colorant through the apertures onto pre-comminuted material prior processing the pre-comminuted material by a waste reducing section of a waste reducing machine into colored mulch.

One advantage of the present invention is that a colorant dispensing system and method is provided that reduces the amount of water used to produce colored mulch by dispensing dry colorant onto pre-comminuted material before grinding. Another advantage of the present invention is that the colorant dispensing system and method distributes dry colorant onto pre-comminuted material before it enters the waste reducing section of a waste reducing machine to permit a waste reducing process to further color the pre-comminuted material to produce colored mulch. Still another advantage of the present invention is that the system may be removably secured to a conventional waste reducing machine to provide retrofit capability. Yet another advantage of the present invention is that the system has a supply hopper releasably secured to a colorant dispensing assembly to efficiently change between different colors.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 2 is a sectional view taken along line 2-2 of FIG. 1, illustrated in operation relationship with a waste processing machine.

DESCRIPTION OF THE PREFERRED EMBODIMENT

Figure 1:
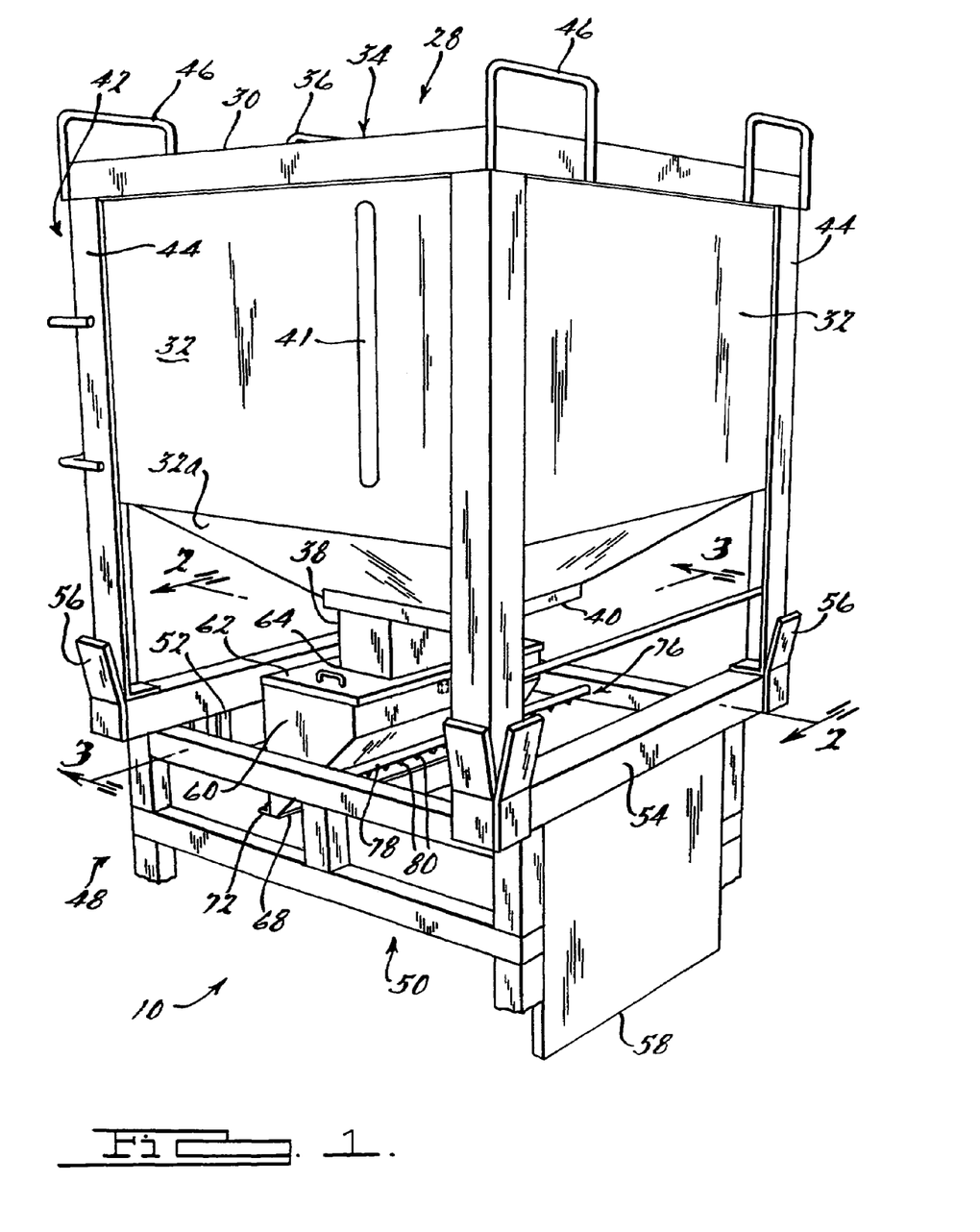
FIG. 1 is a perspective view of a colorant dispensing system, according to the present invention.
Figure 3:
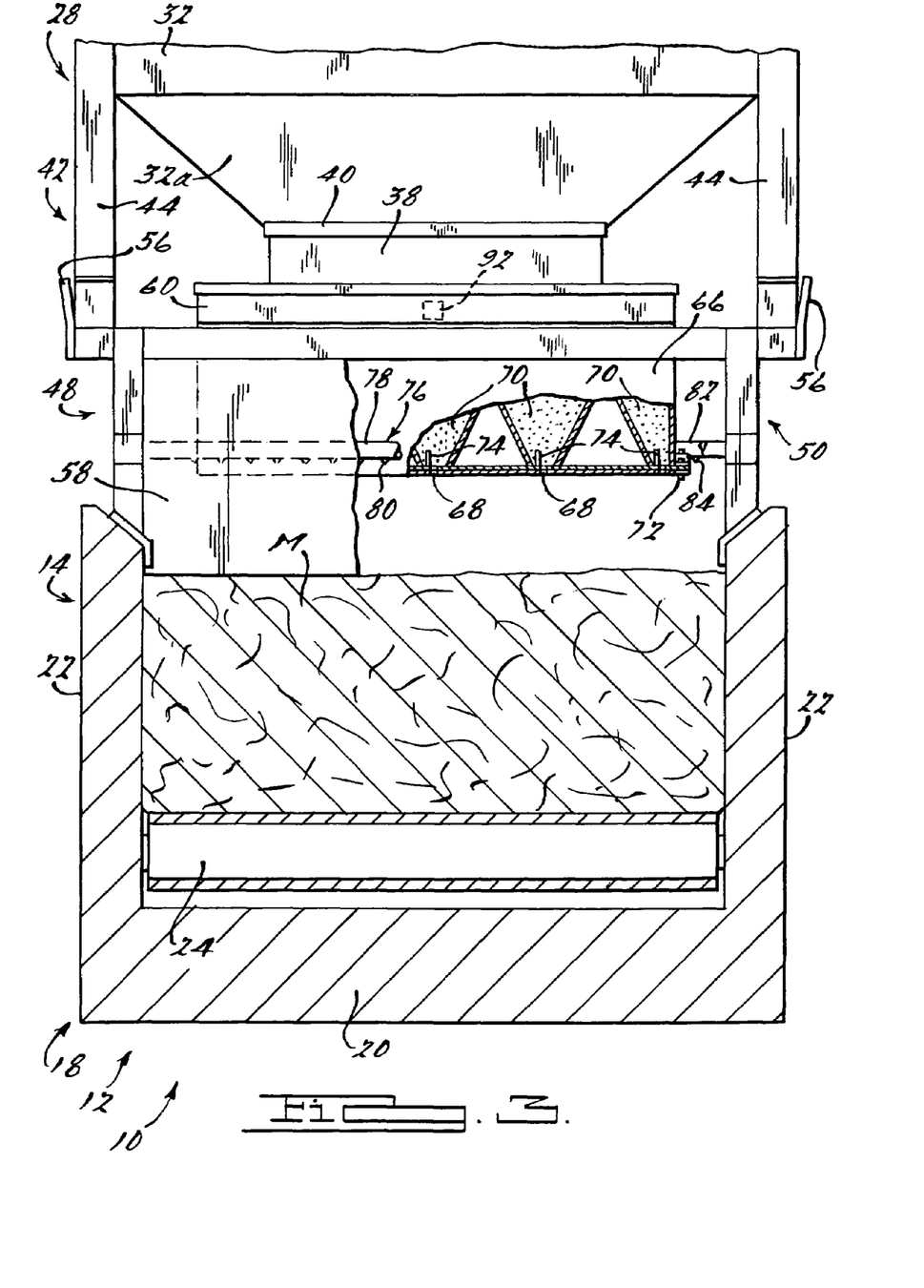
FIG. 3 is a sectional view taken along line 3-3 of FIG. 1, illustrated in operation relationship with a waste processing machine.

Referring now to the drawings, and in particular to FIGS. 1 through 3, one embodiment of a colorant dispensing system, generally shown at 10, according to the present invention, is shown for treating pre-comminuted material with a dry colorant. The colorant dispensing system 10 may be used in connection with a waste reducing machine, generally shown at 12. Generally, the waste reducing machine 12 may be divided into three sections, an in-feed section, generally shown at 14, a waste reducing section, generally shown at 16, and an output section, (not shown but generally known in the art).

The in-feed section 14 includes a frame, generally indicated at 18, which encompasses the in-feed section 14 and the waste reducing section 16. The frame 18 includes a basal member 20 and at least two sidewalls 22 extending upward in generally parallel relation to each other from the basal member 20. The in-feed section 14 also includes an in-feed conveyor 24 is disposed between the sidewalls 22 and operatively secured to the frame 18 to deliver pre-comminuted material (M), namely wood waste material, toward the waste reducing section 16 of a waste reducing machine 12. Pre-comminuted material (M) may include any type of wood based product, such as wood pallets, wood by-products from prior wood manufacturing, as well as other non-wood materials when combined with an appropriate amount of wood material. Pre-comminuted material (M) refers to material which is either small enough to enter a final waste reducing process or which has previously been processed by a primary reduction to reduce large sized material into smaller sized material suitable for processing into comminuted material, such as mulch.

The waste reducing section 16 specifically includes a rotor 26 or other device for reducing pre-comminuted material (M) into mulch. Those having ordinary skill in the art will appreciate that a waste reducing section 16 of a waste reducing machine 12 may include other devices for processing pre-comminuted material (M) into mulch and that the present invention is not limited solely to waste reducing machines 12 whose waste reducing section 16 is primarily a rotor 26. By way of example, other waste reducing sections of waste reducing machines may include what is commonly referred to as, "tub grinder." Accordingly, the present invention may be applied in connection with the waste reducing machine 12 employing a tub grinder as the waste reducing section 16. The output section of a waste reducing machine 12 is typically an elevated conveyor (not shown) to deposit mulch in large piles adjacent the machine 12. Commonly, the output section pivots to distribute large piles of mulch across a predetermined span around the waste reducing machine 12. Output sections may also be extendable to provide additional reach for depositing mulch. It should be appreciated that the waste reducing machine 12 includes many other components not discussed herein, but generally known in the art.

Referring to FIGS. 1 through 3, the colorant dispensing system 10 includes a supply hopper, generally indicated at 28. The supply hopper 28 includes a top panel 30 and at least one, preferably a plurality of side panels 32 cooperating with the top panel 30 to define a storage cavity, generally indicated at 34. The top panel 30 includes a supply lid 36 to facilitate receipt of colorant into the storage cavity 34. The supply lid 36 may be large enough to provide access to the storage cavity 34 for repair, cleaning or other maintenance or the entire top panel 30 may be removed to accomplish the same end. Where the top panel 30 is removable relative to the side panel 32, those having ordinary skill in the art will appreciate that the supply lid 36 need not be employed. By way of example, the top panel 30 may be pivotally attached to the side panel 32 to provide access to the storage cavity 34. Further, those having ordinary skill in the art will appreciate that since the supply hopper 28 stores dry colorant, access to the storage cavity 34 prevents the entry of condensation or water.

The supply hopper 28 further includes a discharge chute 38 including a door 40 to selectively retain and discharge dry colorant from the storage cavity 34 to a colorant dispensing assembly 48, to be described. Accordingly, the side panels 32 are tapered to efficiently direct dry colorant toward the discharge chute 38. As illustrated in FIGS. 1 through 3, the supply hopper 28 includes four side panels 32, wherein a section 32d of each of the panels 32 tapers toward the discharge chute 38. Those having ordinary skill in the art will appreciate that the supply hopper 28 may include any number of side panels 32. By way of example, the supply hopper 28 may include only one side panel 32, which is annular, to provide a substantially conical shape that tapers toward the discharge chute 38.

The supply hopper 28 further includes a sight gauge 41 to provide visual indication of the colorant level within the storage cavity 34. As illustrated in FIGS. 1 through 3, the sight gauge 40 is a window through which a person adjacent the supply hopper 28 may determine the amount of colorant in the storage cavity 34. Those having ordinary skill in the art will appreciate that the storage cavity 34 may possess any capacity desired. By way of example, one type of dry colorant that may be employed for use in connection with the present invention is commercially available under the trademark Granastar™, a granular colorant manufactured by Interstar of Quebec, Canada. Granastar™ granular colorant is available in 2,000 lb. quantities. Accordingly, the minimum capacity of the storage cavity 34 corresponds to a single commercially available quantity of Granastar™.

The supply hopper 28 further includes a housing, generally indicated at 42, having at least one, preferably a plurality of legs 44 to operatively support the storage cavity 34 above a surface on which the legs 44 are positioned. In this manner, the discharge chute 38 and door 40 are readily accessible without interference from the surrounding environment. The housing 42 further includes at least one, preferably a plurality of brackets 46 to facilitate transportation of the supply hopper 28. As illustrated in FIG. 1, the brackets 46 are a number of rings adjacent the top plate 30 through which the tines of a fork-lift or chains may be placed to carry the supply hopper 28 to a desired location. However, those having ordinary skill in the art will appreciate that any type of bracket 46 capable of facilitating transport of the supply hopper 28 may be employed. By way of example, the supply hopper 28 may include channels, pockets or the like (not shown) through which the tines of a fork lift or chains may be placed to move the supply hopper 28. Further, those having ordinary skill in the art will appreciate that the supply hopper 28 may include other components not shown but generally known in the art. By way of example the storage hopper 28 may also include an agitator or vibrating mechanism (not shown) adjacent the discharge chute to facilitate the movement of dry colorant through the discharge chute 38 by disrupting a static state of dry colorant adjacent the discharge chute 38, thereby preventing any clumping or binding that might otherwise occur should moisture or condensation be present in the storage cavity 34.

Referring to FIGS. 1 through 3, the colorant dispensing system 10 further includes a colorant dispensing assembly, generally shown at 48. The colorant dispensing assembly 48 is disposed between the supply hopper 28 and the waste reducing machine 12 where the supply hopper 28 is remotely located relative to the waste reducing machine 12, yet removably engaged to the colorant dispensing assembly 48. Likewise, the colorant dispensing assembly 48 is removably engaged to the waste reducing machine 12. In particular, the colorant dispensing assembly 48 is removably secured to the sidewalls 22 of a waste reducing machine 12 to dispense dry colorant across pre-comminuted material (M) on the in-feed conveyor 24 before entering the waste reducing section 16. In this manner, the removable engagement between the colorant dispensing system 10 and waste reducing machine 12 enables waste reducing machine s to be retro-fit with the system 10 or may be provided as an option for a new waste reducing machine 12. However, those having ordinary skill in the art will appreciate that the colorant dispensing system 10 may also be permanently mounted or fixed to the waste reducing machine 12 by welding, bolting or other manner commonly known in the art. In either event, the colorant dispensing system 10 is positioned to dispense dry colorant onto pre-comminuted material (M) before processing by the waste reducing section 16 of the waste reducing machine 12. While the system 10 refers to applying a dry colorant to pre-comminuted material (M), the present invention may also apply a dry chemical to same.

The colorant dispensing assembly 48 includes an support assembly generally shown at 50, having standoffs or guide bars 52 to provide proper placement of the colorant dispensing assembly 48 above the in-feed conveyor 24 relative to the waste reducing section 16 to effectively dispense dry colorant onto pre-comminuted material (M) prior to entering the waste reducing section 16 of the waste reducing machine 12. To further provide proper placement of the colorant dispensing assembly 48, the support assembly 50 may be bolted, clamped, chained to adjacent areas of the waste reducing machine 12.

The support assembly 50 includes a mounting platform 54 to receive the supply hopper 28 and guide plates 56 adjacent the mounting platform 54 to facilitate receipt of the supply hopper 28 and removably secure same to the colorant dispensing assembly 48. The supply hopper 28 may be further secured to the support assembly 50 by clamps, bolts, chains or the like. As illustrated in FIG. 3, the supply hopper 28 is substantially centered on the colorant dispensing assembly 48. However, other embodiments of the present invention, described in greater detail below, will provide understanding that the supply hopper 28 may also be removably secured to the colorant dispensing assembly 48 in a number of different configurations.

The support assembly 50 further includes a screed 58 to regulate the quantity of pre-comminuted material (M) prior to the application of dry colorant, to be described. Accordingly, use of the screed 58 facilitates the application of dry colorant onto a controlled quantity of pre-comminuted material (M) before it enters the waste reducing section 16 of the waste reducing machine 12 to provide appropriately colored mulch after the pre-comminuted material (M) is processed. The screed 58 is secured to the distal end of the support assembly 50 relative to the waste reducing section 16 of the waste reducing machine 12. Those having ordinary skill in the art will appreciate that the screed 58 may also be height-adjustable to change the regulated quantity of pre-comminuted material (M) to receive a colorant at a certain time. The support assembly 50 may also include a number of additional components such as skirting or flexible containment flaps to control the application of dry colorant onto pre-comminuted material.

The colorant dispensing assembly 48 includes a feed hopper 60 to receive dry colorant from the supply hopper 28. The feed hopper 60 includes a cover 62 having a passage 64 corresponding to the size and shape of the discharge chute 38. During operation of the colorant dispensing system 10, the supply hopper door 40 is open and the discharge chute 38 is disposed in stacked relation to the passage 64 to discharge colorant from the supply hopper 28 to the feed hopper 60. In this manner, dry colorant is discharged into the feed hopper 60 by gravity. However, as previously stated, the supply hopper 28 may further include an agitator or vibrating mechanism (not shown) to facilitate the discharge of colorant to the feed hopper 60.

The feed hopper 60 further includes at least one, preferably a plurality of side panels 60 cooperating with the cover 62 to contain colorant. As illustrated in FIGS. 1 through 3, the feed hopper 60 extends substantially across the in-feed conveyor 24 and includes four side panels 66. However, those having ordinary skill in the art will appreciate that the feed hopper 60 may include any number of side panels 66. The feed hopper 60 further includes at least one, preferably a plurality of apertures 68 to dispense dry colorant onto pre-comminuted material (M) before processing by the waste reducing section 16 of a waste reducing machine 12. As illustrated in FIG. 3, the lower section of the feed hopper 60 includes at least one, preferably a plurality of internal troughs 70 to direct colorant to at least one of the apertures 68. Those having ordinary skill in the art will appreciate that the troughs 70 may be disposed externally along the lower section of the feed hopper 60 to accomplish the same end. Further, those having ordinary skill in the art will also appreciate that where colorant is sufficiently discharged from the supply hopper 28 to the feed hopper 60, colorant may be proportionately distributed to each of the apertures 68, thereby eliminating the plurality of troughs 70.

In any event, an appropriate number of apertures 68 extend along the feed hopper 60, in a substantially perpendicular manner relative to the travel of the in-feed conveyor 24, to effectively dispense colorant across the in-feed section 14 of the waste reducing machine 12 and onto pre-comminuted material (M) before it enters the waste reducing section 16. Those having ordinary skill in the art will appreciate that the colorant dispensing system 10 of the present invention may include any number of other dispensing mechanisms rather than a feed hopper 60 having the apertures 68. By way of example, the present invention may employ pressurized air to propel dry colorant through a plurality of tubes and onto pre-comminuted material (M).

To ensure a consistent. amount of colorant is dispensed from the apertures 68 onto the pre-comminuted material (M), the colorant dispensing assembly 48 further includes a gate 72 to regulate the amount of colorant dispensed by the apertures 68 at a given time. According to the embodiment of the invention illustrated in FIGS. 1 through 3, the gate 72 further includes a plurality of agitators 74 corresponding to the number of apertures 68. The agitators 74 extend through the apertures 68 to facilitate the flow of colorant through the apertures 68 by engaging any clumped colorant. Specifically, the agitators 74 move simultaneously with the movement of the gate 72 to engage colorant before and after the gate 72 cycles between open and closed positions.

The gate 72 is electronically linked to a control module 86, to be described, which provides systematic application of colorant which corresponds to the rate at which pre-comminuted material (M) is fed to the waste reducing section 16 of the waste reducing machine 12. Specifically, the gate 72 regulates the amount of colorant dispensed through apertures 74 on a time-based cycle, i.e. permitting colorant to flow through the apertures 68 for a predetermined amount of time and then closing the flow of colorant for a predetermined amount of time. Accordingly, the combination of the screed 58 and the gate 72 provide for the dispensing of a controlled amount of colorant onto a regulated quantity of pre-comminuted material (M) before the waste reducing process to provide appropriately colored mulch after the waste reducing process. While the gate 72 of the present invention has been described as electronically linked to the control module 86, to be described, those having ordinary skill in the art will appreciate that the gate 72 may also be manually activated as well.

As will be described with respect to the method of the present invention, the time-based cycle is governed by the rate at which pre-comminuted material (M) is directed toward the waste reducing section 16 of the waste reducing machine 12, on average, a cycle time of the gate 72 is 2.5 seconds open to 5.5 seconds closed for an in-feed rate of 2.5 yards of pre-comminuted material (M) per minute. However, those having ordinary skill in the art will appreciate that the gate 72 may also regulate the amount of colorant dispensed through the apertures 68 on a fractional-based principle, i.e. adjusting the gate 72 to open only a fractional amount of the apertures 68, proportional to the in-feed rate of pre-comminuted material (M). By way of example, such a manner of regulating colorant flow would cause the gate 72 to adjust the aperture 68 from closed to half open to full open and anywhere therebetween depending on the rate at which pre-comminuted material (M) was entering the waste reducing section 16 of the machine 12.

Also, those having ordinary skill in the art of waste reducing machines will appreciate that one area of the waste reducing section 16 of the machine 12 may receive a greater concentration of pre-comminuted material (M) than another area. Such disproportionate placement of pre-comminuted material (M) may be the product of the rotational direction of the rotor 26 or due to an initial placement of unbalanced load of pre-comminuted material (M) onto the in-feed conveyor 24. Such disproportionate placement may result in an inconsistent application of colorant onto the pre-comminuted material (M). Accordingly, the gate 72 may include a contoured leading edge to selectively permit a predetermined number of apertures 68 to dispense colorant onto the pre-comminuted material (M), thereby concentrating more colorant within a particular area across the in-feed section 14 that receives a greater amount of pre-comminuted material (M). In combination with the gate 72 having a contoured leading edge or in lieu thereof, there may exist a greater number of apertures 68 disposed relative to one area of the in-feed conveyor 24 that receives the greater quantity of pre-comminuted material (M) to accomplish the same end.

Referring to FIGS. 1 through 3, the colorant dispensing assembly 48 further includes a spray assembly, generally indicated at 76. Where appropriate, the spray assembly 76 sprays a non-colorant liquid, for example water, onto the pre-comminuted material (M) before it enters the waste reducing section 16 of a waste reducing machine 12. As described in greater detail below, the need to apply non-colorant liquid is largely based on the moisture content of the pre-comminuted material (M). The spray assembly 76 includes at least one injection line 78 supported by the support assembly 50 and operatively engaged to a non-colorant liquid source (not shown), such as a water reservoir or chemical tank. The spray assembly 76 further includes at least one, preferably a plurality of spray nozzles 80 operatively engaged to the injection line 78 and disposed across the in-feed section 14 of the machine 12 to spray non-colorant liquid onto pre-comminuted material (M) before colorant is applied thereto.

In the embodiment illustrated in FIGS. 1 through 3, the spray assembly 76 has a first and a second injection line 78, 82 each and corresponding spray nozzles 80, 84, respectively. The first injection 78 line and spray nozzles 80 are employed as described above, while the second injection line 82 and spray nozzles 84 are operatively supported similar to the first injection line 78 and spray nozzles 80, but the spray nozzles 84 are directed to spray non-colorant liquid onto pre-comminuted material (M) after application of the dry colorant. In this manner, the pre-comminuted material (M) receives a non-colorant liquid prior to receiving the dry colorant and, where appropriate, also receives a second application of non-colorant liquid after receiving the dry colorant. The non-colorant liquid commonly employed is water. However, those having ordinary skill in the art will appreciate that the other non-colorant liquids such a pesticides, herbicides or fertilizers may also be employed.

Further, those having ordinary skill in the art will appreciate that where first and second injection lines 78, 82 and corresponding spray nozzles 80, 84 are employed, both of the injection lines 78, 82 may be operatively engaged to the same non-colorant liquid source or may be operatively engaged to two different non-colorant liquid sources, thereby enabling more than one type of non-colorant liquid to be applied to the same pre-comminuted material (M) where desired. In applications where the first and second injection lines 78, 82 are operatively engaged to the same non-colorant liquid, the total amount of non-colorant liquid is conserved since it may be applied in stages to prevent run-off, which can occur when the same amount of non-colorant liquid is sprayed onto pre-comminuted material (M) in a single application. Applying the same non-colorant liquid in a two-stage sequence, as capable where a first and second injection lines 78, 82 are employed, may also prevent problems associated with over-saturating or under-applying non-colorant liquid that occur where a single application of liquid is employed.

Figure 6:
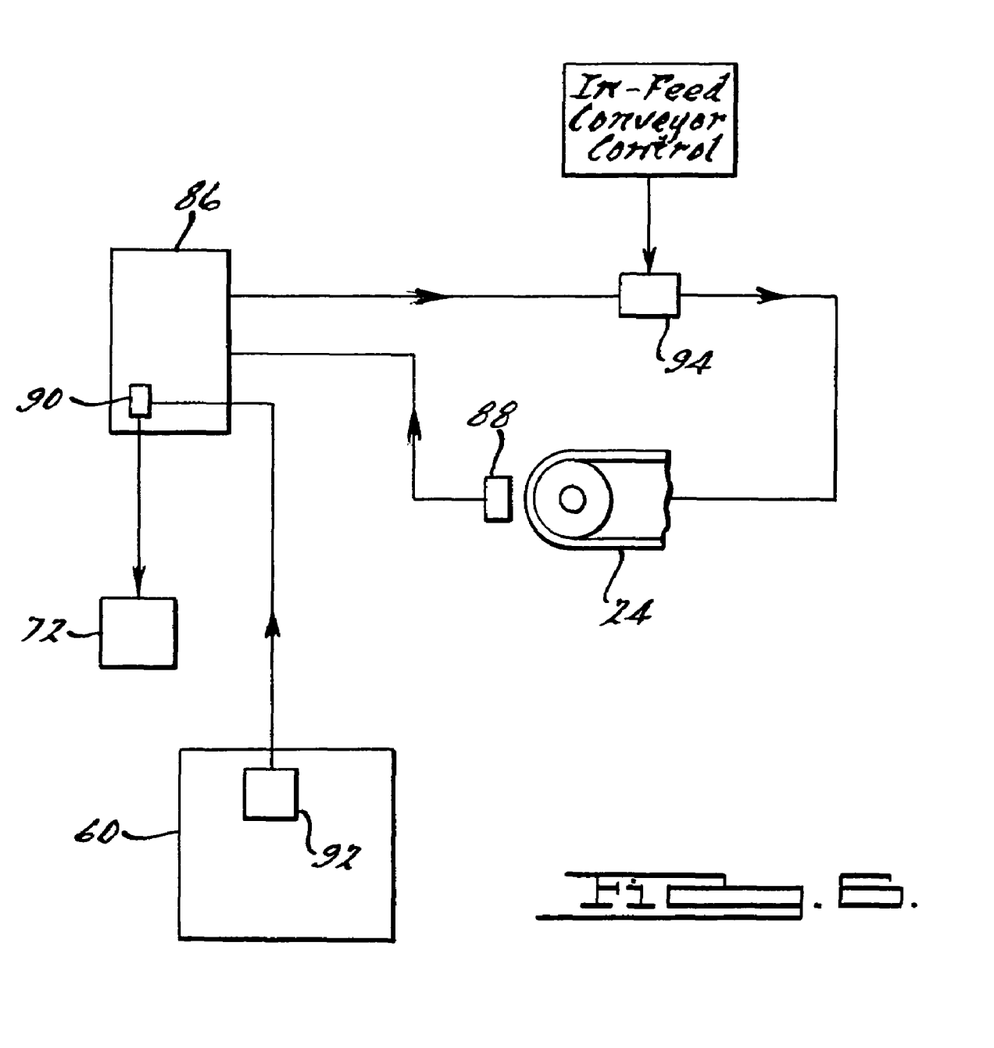
FIG. 6 is a schematic diagram of a control module of the colorant dispensing system of FIGS. 1 through 5.

Referring to FIG. 6, the colorant dispensing assembly 48 further includes a control module 86 to regulate the amount of dry colorant distributed onto the pre-comminuted material (M) from the apertures 68. The control module 86 includes a feed sensor 88 operatively engaged to the machine 12 to sense the rate at which the in-feed conveyor 24 directs pre-comminuted material (M) toward the waste reducing section 16 of the waste reducing machine 12. Based upon the rate sensed by the feed sensor 88, the control module 86 determines the appropriate cycle time for the gate 72 and activates the gate 72 to remain open for the appropriate time and closed for the appropriate time. In this manner, dry colorant is efficiently yet effectively applied to pre-comminuted material (M) prior to entering the waste reducing section 16 of the machine 12. The control module 86 further includes a colorant density control 90 to permit an operator of the present invention to increase the amount of colorant dispensed onto pre-comminuted material (M) from the amount determined based on the rate sensed by the feed sensor 88.

The control module 86 further includes a colorant sensor 92 operatively engaged to the feed hopper 60 to sense when the level of colorant therein is less that a predetermined minimum. The colorant sensor 92 within the feed hopper 60 may include a pressure sensor or other sensor suitable for use in connection with the environment found within a feed hopper 60 to sense the quantity of a dry or granular substance. The control module 86 is electronically linked to the machine 12 through an interconnect plug 94, which provides the control module 86 with the ability to interrupt the machine's activation of the in-feed conveyor 24. As described in greater detail below, upon receipt of a signal from the colorant sensor 92 that the level of colorant is less than a predetermined minimum, the control module 86 stops the in-feed conveyor 24 from continuing to deliver pre-comminuted material (M) to the waste reducing section 16. In this manner, the control module 86 prevents non-colored mulch from mixing with colored mulch.

Figure 4:
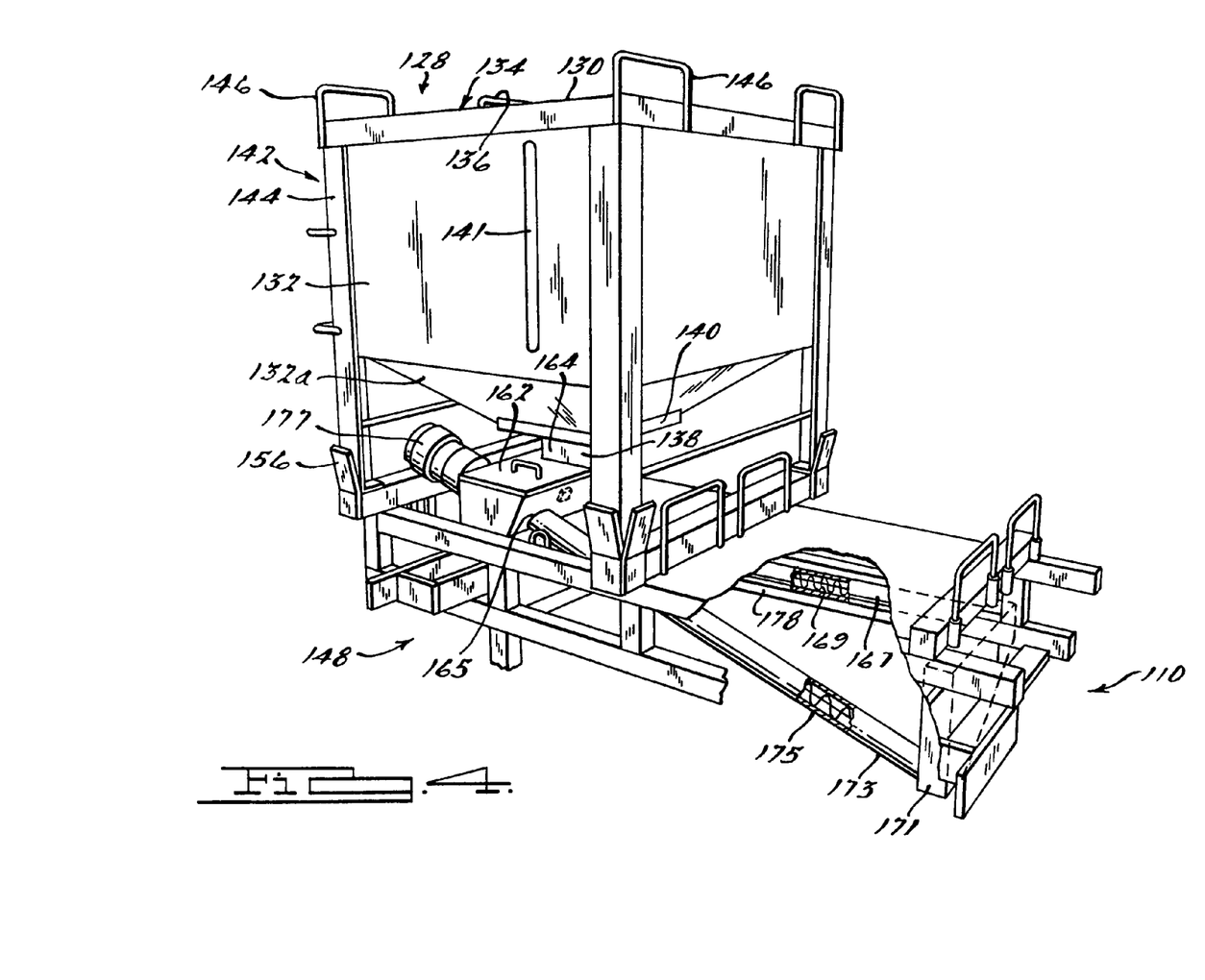
FIG. 4 is a perspective view of another embodiment, according to the present invention, of the colorant dispensing system of FIG. 1.

Referring to FIG. 4, another embodiment, according to the present invention, of the colorant dispensing system 10 is shown. Like parts of the colorant dispensing system have like reference numerals increased by one hundred. In this embodiment, the supply hopper 128 of the colorant dispensing assembly 110 is substantially similar in structure to the supply hopper 28 shown in FIGS. 1 through 3. Yet, its location relative to the colorant dispensing assembly 148 is off-center rather than the substantially centered location shown in FIGS. 1 through 3. However, the colorant dispensing assembly 148 shown in FIG. 4 includes only some structure similar to the colorant dispensing assembly 48 shown in FIGS. 1 through 3 and so the description of the structure of the colorant dispensing assembly 148 will not be repeated here except where expressly mentioned below.

Referring to FIG. 4, the colorant dispensing assembly 148 remains positioned relative to the waste reducing machine 12 and removably secured thereto. The supply hopper 128 is likewise removably mounted atop the colorant dispensing assembly 148 to discharge dry colorant to same. The colorant dispensing assembly 148 includes a feed hopper 160 that receives dry colorant from the supply hopper 128. The feed hopper 160 includes a cover 162 having a passage 164, a dispensing port 165 and at least one side panel 166. As illustrated in FIG. 4, the feed hopper 160 includes four side panels 166, where one of the side panels 166 tapers toward the dispensing port 165. As described with respect to the embodiment of the present invention shown in FIGS. 1 through 3, the feed hopper 160 may include any number of side panels 166 and cover configurations, all of which are incorporated by reference herein with respect to the embodiment of the present invention shown in FIG. 4.

The color dispensing assembly 148 further includes a distribution chamber, generally shown at 167. The distribution chamber 167 is mechanically linked to the feed hopper 160 to provide efficient transfer of dry colorant from the feed hopper 160 onto the pre-comminuted material. Specifically, the distribution chamber 167 is a tube-like structure extending from the dispensing port 165 across the width of the in-feed conveyor 24 of the waste reducing machine 12. The distribution chamber 167 includes a plurality of apertures 168 aligned along the underside of the distribution chamber 167 to dispense colorant onto pre-comminuted material (M) before it enters the waste reducing section 16 of the machine 12. To facilitate transfer of the colorant from the feed hopper 160 to the apertures 168, the distribution chamber 167 includes a feed auger 169. Specifically, a drive mechanism (not shown) powers the feed auger 169 to cycle colorant across the in-feed conveyor 24 through the distribution chamber 167 to the apertures 168. The drive mechanism may include an electronic motor or the like suitable for driving the feed auger 169. Although the embodiment of the present invention shown in FIG. 4 illustrates the feed auger 169 to cycle colorant through the distribution chamber 167, those having ordinary skill in the art will appreciate that any method of transferring colorant through the distribution chamber 167 may be employed. By way of example, a conveyor belt may be employed to accomplish the same end.

In order to provide consistent flow of colorant to the apertures 168, the feed auger 169 transfers more colorant through the distribution chamber 167 than readily dispensed by same. Specifically, the feed auger 169 transfers approximately ⅓ more colorant than dispensed through the apertures 168. However, those having ordinary skill in the art will appreciate that any amount of colorant greater than the amount readily dispensed by the apertures 168 would ensure consistent colorant flow to all of the apertures 168 across the in-feed section 14. To prevent wasting the excess colorant, the colorant dispensing system 110 includes a transfer chute 171 and a return conduit 173. The return conduit 173 further includes a return auger 175 to direct colorant. Excess colorant from the feed auger 169 is deposited in the transfer chute 171 and the return auger 173, disposed between the transfer chute 171 and the feed hopper 160, subsequently returns colorant collected in the transfer chute 171 back into the feed hopper 160 through the return conduit 173. Similar to the feed auger 169, the return auger 175 is driven by a drive mechanism 177 such as an electric motor or the like. However, those having ordinary skill in the art will appreciate that both the feed auger 167 and the return auger 175 may be driven by the same drive mechanism.

To ensure consistent amount of colorant flows from the apertures 168 onto the pre-comminuted material, the distribution chamber 167 further includes a gate 172 to regulate the amount of colorant that may be dispersed from the apertures 168 at a given time. The gate 172 is similar in structure to the gate 72 described with respect to FIGS. 1 through 3. However, the gate 172 illustrated in FIG. 4 does not include agitators 74 to engage the colorant since the colorant is agitated by the feed auger 169. Accordingly, the description of the gate 72 with respect to the embodiment of the present invention shown in FIGS. 1 through 3, with the exception of the agitators 74, is incorporated by reference as though full set forth herein with respect to the embodiment of the present invention shown in FIG. 4.

Additionally, the remaining components of the embodiment of the present invention shown in FIG. 4, namely the spray assembly 176 and control module 186, are similar in structure to that described with respect to the embodiment shown FIGS. 1 through 3 and are therefore incorporated by reference as though fully set forth herein with respect to the embodiment of the present invention shown in FIG. 4.

Figure 5:
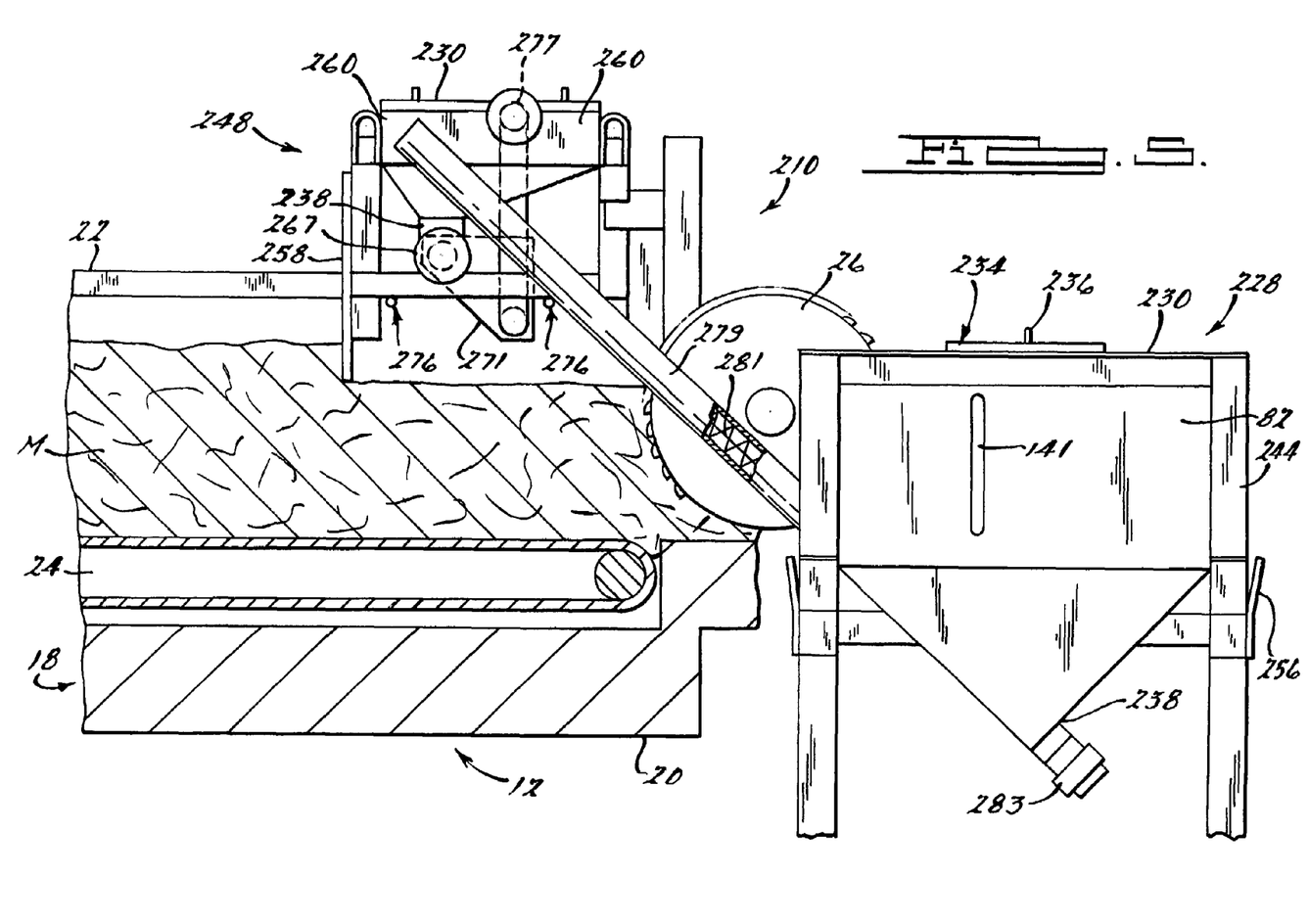
FIG. 5 is a fragmentary elevational view of yet another embodiment, according to the present invention, of the colorant dispensing system of FIG. 1.

Referring to FIG. 5, yet another embodiment according to the present invention of the colorant dispensing system 10 is shown. Like parts of the colorant dispensing system have like reference numerals increased by two hundred. In this embodiment, the supply hopper 228 of the colorant dispensing system 210 is substantially similar in structure to the supply hopper 28, 128 shown in FIGS. 1 through 4. Yet, the location of the supply hopper 228 relative to the colorant dispensing assembly 248 is adjacent the waste reducing machine 12 rather than removably engaged to the colorant dispensing assembly 248 as illustrated in the embodiments shown in FIGS. 1 through 4. However, the colorant dispensing assembly 210 includes structure similar to the colorant dispensing assembly 148 illustrated in FIG. 4 and so the description of similar structure of the colorant dispensing assembly 248 will not be repeated here except where expressly mentioned below.

Referring to FIG. 5, the colorant dispensing assembly 248 remains positioned relative to the machine 12 and removably secured thereto. However, the supply hopper 228 is no longer disposed atop the colorant dispensing assembly 248. Rather, the supply hopper 228 is remotely located adjacent the machine 12 and colorant dispensing assembly 248, but remains readily adapted to discharge dry colorant to the colorant dispensing assembly 248. Specifically, in this embodiment, the colorant dispensing assembly 248 includes a supply conduit 279 disposed between the discharge chute 238 of the supply hopper 228 and the feed hopper 260. The supply conduit includes a supply auger 281 to transfer colorant from the supply hopper 228 to the feed hopper 260. Similar to the feed auger 169 and return auger 173 described above with respect to the embodiment of the present invention shown in FIG. 4, the supply auger 281 is driven by a drive mechanism 283 to facilitate transfer of colorant to the feed hopper 260.

Additionally, the remaining components of the embodiment of the present invention shown in FIG. 5, namely of the colorant dispensing assembly 248, are similar in structure to that described with respect to the embodiment of the present invention shown FIG. 4 and are therefore incorporated by reference as though fully set forth herein with respect to the embodiment of the present invention shown in FIG. 5.

Referring now to the method, according to the present invention, for adding colorant to pre-comminuted material (M) before entering the waste reducing section 16 of the machine 12, dry colorant is supplied from the supply hopper 28 to the colorant dispensing assembly 48. Specific to the embodiments shown in FIGS. 1 through 4, the colorant is supplied on a gravity-based method, given the placement of the supply hopper 28, 128 relative to the colorant dispensing assembly 48, 148. Specific to the embodiment illustrated in FIG. 5, the colorant is supplied by the supply conduit 279 of the colorant dispensing assembly 248, removably engaged to the supply hopper 228.

Following receipt from the supply hopper 28, the colorant is directed toward the apertures 68 disposed across the in-feed section 14 of the waste reducing machine 12. Relative to the embodiment illustrated in FIGS. 1 through 3, the colorant is directed from the feed hopper 60 to the apertures by gravity and facilitated by internal troughs 70 adjacent each aperture 68. The embodiments illustrated in FIGS. 4 and 5 direct colorant by the feed auger 169, 269 within the distribution chamber 167, 267 and excess colorant is directed back to the feed hopper 160, 260 by a transfer chute 171, 271 and return conduit 173. In either event, the dry colorant is prepared to be dispensed onto pre-comminuted material (M) directed toward the waste reducing section 16 of a waste reducing machine 12.

Prior to receiving colorant, the pre-comminuted material (M) engages the screed 58 along the support assembly 50 of the colorant dispensing assembly 48. The screed 58 regulates the amount of pre-comminuted material (M) to receive colorant at a given time to provide a proportionate quantity of pre-comminuted material (M) across the in-feed conveyor 24. As the regulated amount of pre-comminuted material (M) further traverses toward the waste reducing section 16 of the machine 12, the spray nozzles 80 of the first injection 78 line apply a non-colorant liquid to the regulated pre-comminuted material (M). While the application of a non-colorant liquid may not be necessary, given the moisture content of the pre-comminuted material, a small amount of non-colorant liquid may regularly be applied to reduce the likelihood of generating dust during the application of the colorant. Further, a small amount of non-colorant liquid applied to the pre-comminuted material (M) will also facilitate contact between the colorant and the pre-comminuted material (M).

The application of a non-colorant liquid onto pre-comminuted material (M) is not appropriate in every circumstance. Rather it depends on the moisture content of the pre-comminuted material (M) to be processed into mulch. Further, the method of the present invention, even with the application of a non-colorant liquid such as water, will consume considerably less liquid than traditional liquid-based colorant processes. By way of example, where the pre-comminuted material (M) is extremely dry, such as with pre-comminuted wood pallets, the amount of water employed according to the method of the present invention is approximately 25 gallons per minute (gpm) as opposed to approximately 35 gpm with respect to the application of liquid colorant to the same material. Further by way of example, where the moisture content of the pre-comminuted material (M) is high, as little as 0-2 gpm may be employed to apply dry colorant, while the traditional processes of applying liquid-based colorant does not consider the moisture content, thus the amount of water consumed during the traditional processes remains substantially the same (i.e. 35 gpm).

After engaging the screed 58 and optionally wetting the pre-comminuted material (M), a controlled amount of dry colorant is dispensed through the apertures 68 onto pre-comminuted material (M) prior processing it into colored mulch. The amount of colorant dispensed from the apertures 68 is controlled by a gate 72 that cycles between opened and closed positions to permit the release of colorant through the apertures 68. Specifically, the cycle of the gate 72 is controlled by the control module, which bases the cycle time on the rate at which the in-feed conveyor directs pre-comminuted material (M) toward the waste reducing section 16 of the machine 12. In this manner, the amount of dispensed colorant substantially corresponds to the quantity of regulated pre-comminuted material (M) to provide a proper coloring without over-saturation, thereby reducing the amount of colorant used. Also, relative to the embodiments of the present invention illustrated in FIGS. 4 and 5 since not all colorant may be dispensed through the apertures 168, 268, the excess colorant is transferred back to the feed hopper 160, 260 by way of the transfer chute 171, 271 and return conduit 173, 273.

During operation, as the level of colorant dispensed from the feed hopper 60 reaches a predetermined level, the colorant sensor 92 within the feed hopper 60 transmits a signal to the control module 86. The control module 86 then disengages the in-feed conveyor 24 to halt the flow of pre-comminuted material (M) toward the waste reducing section 16 of the machine 12. Thus, preventing waste reducing section 16 from processing pre-comminuted material (M) without colorant, ultimately preventing non-colored mulch from contaminating colored mulch.

After receiving colorant, the regulated pre-comminuted material (M) may receive a second application of non-colorant liquid through the spray nozzles 84 corresponding to the second injection line 82. The second application of non-colorant liquid may be same non-colorant liquid as applied through spray nozzles 80 of the first injection line 78 or a different non-colorant liquid may be applied. Following the receipt of a colorant or a second application of non-colorant liquid, as the case may be, the colorant-treated, pre-comminuted material (M) is received by the waste reducing section 16, namely the grinding wheel 26, where the colorant and pre-comminuted material (M) are cooperatively crushed/shredded together during the material reducing process, thereby further displacing the colorant onto the pre-comminuted material (M) and producing thoroughly colored product, i.e. mulch. It should be appreciated that the operation of the colorant dispensing systems 110 and 210 is similar to the colorant dispensing system 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A colorant dispensing system for adding colorant to pre-comminuted material comprising:
   a supply hopper to retain and discharge dry colorant;
   a colorant dispensing assembly to receive dry colorant from said supply hopper and dispense dry colorant onto pre-comminuted material (M) before it is processed by a waste reducing section of a waste reducing machine;
   wherein said colorant dispensing assembly includes a feed hopper having at least one aperture to dispense dry colorant, a gate movably engaged to said feed hopper to selectively permit the release of dry colorant from said at least one aperture, and a control module operatively engaged to said gate to control the rate at which dry colorant is dispensed from said at least one aperture; and
   wherein said control module further includes a colorant sensor operatively engaged to said feed hopper to sense when the level of colorant within said feed hopper is less than a predetermined minimum level and a feed sensor operatively engaged to the waste reducing machine to sense the rate at which pre-comminuted material is fed toward the waste reducing section of the waste reducing machine.

2. A colorant dispensing system as set forth in claim 1 wherein said supply hopper is removably engaged to said colorant dispensing assembly to supply dry colorant to said colorant dispensing assembly and said colorant dispensing assembly is removably engaged to the waste reducing machine.

3. A colorant dispensing system as set forth in claim 1 wherein said supply hopper includes a top panel, at least one side panel cooperating with said top panel to define a storage cavity, and a discharge chute to discharge colorant from said storage cavity.

4. A colorant dispensing system as set forth in claim 3 wherein said discharge chute is disposed in stacked relation to said colorant dispensing assembly to discharge colorant from said storage cavity to said colorant dispensing assembly.

5. A colorant dispensing system as set forth in claim 1 wherein said feed hopper includes a cover and a plurality of surfaces that direct colorant toward said apertures.

6. A colorant dispensing system as set forth in claim 1 wherein said colorant dispensing assembly further includes a screed to regulate the quantity of pre-comminuted material to receive dry colorant from said apertures.

7. A colorant dispensing system as set forth in claim 1 wherein said colorant dispensing assembly further includes a spray assembly having at least one injection line to direct a non-colorant liquid and at least one spray nozzle operatively engaged to said injection line to spray a non-colorant liquid onto pre-comminuted material.

8. A colorant dispensing system for dispensing colorant onto pre-comminuted material prior to being reduced comprising:
   a supply hopper;
   a colorant dispensing assembly including a feed hopper to receive dry colorant from said supply hopper, a distribution chamber to receive dry colorant from said feed hopper, said distribution chamber including a plurality of apertures to dispense dry colorant, a gate movably engaged to said distribution chamber to selectively permit the release of dry colorant from said apertures, and a control module operatively engaged to said gate to control the rate at which dry colorant is dispensed from said apertures; and
   wherein said control module further includes a colorant sensor operatively engaged to said feed hopper to sense when the level of colorant within said feed hopper is less than a predetermined minimum.

9. A colorant dispensing system as set forth in claim 8 wherein said feed hopper includes a cover having a removable feed door, a dispensing port and at least one side panel cooperating with said cover that tapers toward said dispensing port.

10. A colorant dispensing system for dispensing colorant onto pre-comminuted material prior to being reduced comprising:
    a supply hopper;
    a colorant dispensing assembly including a feed hopper to receive dry colorant from said supply hopper, a distribution chamber to receive dry colorant from said feed hopper, said distribution chamber including a plurality of apertures to dispense dry colorant, a gate movably engaged to said distribution chamber to selectively permit the release of dry colorant from said apertures, and a control module operatively engaged to said gate to control the rate at which dry colorant is dispensed from said apertures; and
    wherein said distribution chamber includes a feed auger to transfer dry colorant from said feed hopper to said apertures, a transfer chute operatively engaged to said feed auger to collect excess colorant from said feed auger, and a return conduit having a return auger disposed between said transfer chute and said feed hopper to return excess colorant from said transfer chute to said feed hopper.

11. A colorant dispensing system as set forth in claim 10 wherein said control module is electronically linked to said feed auger and said return auger to activate and deactivate the transfer of colorant.

12. A colorant dispensing system for dispensing colorant onto pre-comminuted material prior to being reduced comprising:
    a supply hopper;
    a colorant dispensing assembly including a feed hopper to receive dry colorant from said supply hopper, a distribution chamber to receive dry colorant from said feed hopper, said distribution chamber including a plurality of apertures to dispense dry colorant; and wherein said colorant dispensing assembly further includes a screed to regulate the quantity of pre-comminuted material to receive dry colorant from said apertures, a plurality of standoffs to facilitate proper placement relative to a predetermined area of a waste reducing machine, a mounting platform to receive said supply hopper, and a plurality of guide plates adjacent said mounting platform to facilitate receipt of said supply container onto said mounting platform.

13. A colorant dispensing system for dispensing colorant onto pre-comminuted material prior to being reduced comprising:

a supply hopper;

a colorant dispensing assembly including a feed hopper to receive dry colorant from said supply hopper, a distribution chamber to receive dry colorant from said feed hopper, said distribution chamber including a plurality of apertures to dispense dry colorant, a gate movably engaged to said distribution chamber to selectively permit the release of dry colorant from said apertures, and a control module operatively engaged to said gate to control the rate at which dry colorant is dispensed from said apertures; and wherein said control module further includes a feed sensor operatively engaged to a waste reducing machine to sense the rate at which pre-comminuted material is fed toward a waste reducing section of a waste reducing machine.

14. A colorant dispensing system as set forth in claim 13 wherein said control module further includes a color density control to increase the amount of colorant dispensed by said apertures at a rate no less than the feed rate sensed by said feed sensor.

15. A colorant dispensing assembly for dispensing colorant onto pre-comminuted material comprising:

a feed hopper to store and to dispense dry colorant;

a gate movably engaged to said feed hopper to selectively permit the release of dry colorant;

a control module operatively engaged to said gate to control the rate at which dry colorant is dispensed to apply a controlled amount of dry colorant to pre-comminuted material before engaging a waste reducing section of a waste reducing machine; and wherein said control module further includes a feed sensor operatively engaged to a waste reducing machine to sense the rate at which pre-comminuted material is fed toward the waste reducing section of a waste reducing machine.

16. A colorant dispensing assembly as set forth in claim 15 further includes a distribution chamber operatively supported by said feed hopper, said distribution chamber having said apertures and a feed auger to transfer dry colorant from said feed hopper to said apertures.

17. A colorant dispensing assembly for dispensing colorant onto pre-comminuted material comprising:

a feed hopper to store and to dispense dry colorant;

a gate movably engaged to said feed hopper to selectively permit the release of dry colorant;

a control module operatively engaged to said gate to control the rate at which dry colorant is dispensed to apply a controlled amount of dry colorant to pre-comminuted material before engaging a waste reducing section of a waste reducing machine;

a distribution chamber operatively supported by said feed hopper, said distribution chamber having a plurality of apertures and a feed auger to transfer dry colorant from said feed hopper to said apertures; and a transfer chute operatively engaged to said feed auger to collect excess colorant from said feed auger and a return conduit disposed between said transfer chute and said feed hopper to return excess colorant from said transfer chute to said feed hopper.

18. A colorant dispensing assembly for dispensing colorant onto pre-comminuted material comprising:

a feed hopper to store and to dispense dry colorant;

a gate movably engaged to said feed hopper to selectively permit the release of dry colorant;

a control module operatively engaged to said gate to control the rate at which dry colorant is dispensed to apply a controlled amount of dry colorant to pre-comminuted material before engaging a waste reducing section of a waste reducing machine, said control module including a colorant sensor operatively engaged to said feed hopper to sense when the level of colorant within said feed hopper is less than a predetermined minimum; and wherein said control module further includes a color density control to increase the amount of colorant dispensed at a rate greater than said minimum amount of colorant as sensed by said colorant sensor.

19. A colorant dispensing assembly for dispensing colorant onto pre-comminuted wood material comprising:

a feed hopper for connection to a waste reducing machine to store colorant, said feed hopper including a plurality of apertures to dispense dry colorant onto pre-comminuted wood material passing underneath said apertures;

a gate movably engaged to said feed hopper to selectively permit the release of dry colorant;

a control module operatively engaged to said gate to control the rate at which dry colorant is dispensed to apply a controlled amount of dry colorant to pre-comminuted material before engaging a primary waste reducing section of the waste reducing machine; and at least one liquid line having at least one nozzle directed to spray a non-colorant liquid onto the pre-comminuted material.

* * * * *

UNITED STATES PATENT AND TRADEMARK OFFICE
CERTIFICATE OF CORRECTION

| | | |
|---|---|---|
| PATENT NO. | : 7,381,271 B2 | Page 1 of 2 |
| APPLICATION NO. | : 10/885567 | |
| DATED | : June 3, 2008 | |
| INVENTOR(S) | : Royce A. Farmwald and Paul J. Farmwald | |

It is certified that error appears in the above-identified patent and that said Letters Patent is hereby corrected as shown below:

On the Title Page, after "(65) Prior Publication Data
US 2005/0006419A1 Jan. 13, 2005", insert -- Related U.S. Application Data
(60) Provisional Application No. 60/485,248, filed on Jul. 7, 2003. --.

Column 1, line 6, insert
-- CROSS REFERENCE TO RELATED APPLICATIONS
   The present application claims the priority date of copending U.S. Provisional Patent Application Ser. No. 60/485,248, filed Jul. 7, 2003. --;

Column 5, line 25, "machine s" should read -- machines --;

Column 5, line 2, "By way of example the storage" should read -- By way of example, the storage --;

Column 5, line 39, "an" should read -- a --;

Column 9, line 61, "pre-comminutedmaterial." should read
-- pre-comminutedmaterial(M). --;

Column 10, line 51, "full" should read -- fully --;

Column 10, line 57, "shown FIGS. 1 through 3" should read -- shown in FIGS. 1 through 3 --;

Column 11, line 32, "shown FIG. 4" should read -- shown in FIG. 4 --;

Column 12, line 37, "prior processing" should read -- prior to processing --;

Column 13, line 2, "may be same" should read -- may be the same --; and

UNITED STATES PATENT AND TRADEMARK OFFICE
CERTIFICATE OF CORRECTION

PATENT NO. : 7,381,271 B2
APPLICATION NO. : 10/885567
DATED : June 3, 2008
INVENTOR(S) : Royce A. Farmwald and Paul J. Farmwald It is certified that error appears in the above-identified patent and that said Letters Patent is hereby corrected as shown below:

Column 15, Claim 16, line 4, "said apertures" should read -- apertures --.

Signed and Sealed this

Twenty-third Day of September, 2008

JON W. DUDAS
*Director of the United States Patent and Trademark Office*